United States Patent [19]
Silverman

[11] 4,084,742
[45] Apr. 18, 1978

[54] PRICE MARKING SYSTEM FOR AUTOMATED CHECK-OUT OF MERCHANDIZE

[76] Inventor: Richard H. Silverman, 347 N. Ave., Weston, Mass. 02193

[21] Appl. No.: 711,091

[22] Filed: Aug. 2, 1976

[51] Int. Cl.² .................. G06K 15/02; B41F 17/00
[52] U.S. Cl. .................................. 235/419; 101/41
[58] Field of Search ............. 235/61.11 E, 61.11 D, 235/61.7 B, 61.9 R, 61.9 A; 340/149 A; 250/555, 566, 568; 101/41, 93, 93.47, DIG. 3

[56] References Cited

U.S. PATENT DOCUMENTS 3,989,929   11/1976   Treiber ..................... 235/61.9 R

OTHER PUBLICATIONS

Read/Write Stylus, IBM Technical Disclosure Bulletin, vol. 19, No. 1, Jun. 1976.

Primary Examiner—Daryl W. Cook
Attorney, Agent, or Firm—Wolf, Greenfield & Sacks

[57] ABSTRACT

The invention concerns automated check-out systems of the type where items offered for sale are individually marked with a machine readable code that identifies the item. For flexibility in changing the prices of the goods, prices are not ordinarily marked on the individual items offered for sale but rather the price of each item is automatically marked on it at the check-out station at the time of purchase. At the check-out station, a scanner reads the machine readable code on an item and derives signals that are sent to a computer. The computer correlates the code read by the scanner with the prices of items stored in a programmable memory device and transmits signals representing the price for the item. At the check-out station, a printer responds to the price signals by printing the price in human readable form on an adhesive tag. The tag is then placed by a tag dispensing mechanism upon the item whose code was read. Where the item already is marked with human readable price information prior to the code being read at the check-out station, the printer and tag dispenser can be inhibited so as not to again mark the item with its price.

3 Claims, 4 Drawing Figures

PRICE MARKING SYSTEM FOR AUTOMATED CHECK-OUT OF MERCHANDIZE

This invention relates in general to systems employing merchandize marked with machine readable encoded information and more particularly pertains to an arrangement for placing on the item added information, such as the cost of an item, in human readable form at the check-out station.

In present day operation of retail shops such as supermarkets and department stores it is customary to mark each item of merchandize with its price so that the customer can see the price prior to sale. In food stores, the price is generally marked directly upon the goods whereas in stores which sell other kinds of merchandize the price is generally marked upon a tag attached to the goods. Those markings methods are somewhat inflexible where the price of merchandize fluctuates or where it is desired to promote sales by lowering the price for specified time periods because the price marked directly on the article must be changed by obliterating the old price and marking the new price on the article.

In recent years it has been proposed to automate the "check-out" of merchandize by having each item carry a machine readable code which is read at the check-out station by a code scanner. To enable an inventory of goods to be automatically maintained, the code identifies the item and may also carry other information. However, because the code is generally incomprehensible to the buyer, it is still the general practice to mark the price in human readable form upon each item. Thus, many of the automated check-out systems employ price markings on the individual items on the shelves of the store even though the items carry machine readable encoded information.

With the advent of machine readable code markings on merchandize, it has been proposed to eliminate the human readable price markings and to provide the purchaser at the check-out station with a sales slip on which is tallied the prices of the individual items and the total purchase price. In this procedure, the price of each item is stored in the memory of a computer and matched at the time of check-out with the code identifying the item. The computer causes an identification of the item to be printed on the sales slip to enable the customer to match the item with its price. The objective of providing an itemized list with prices to the customer is to eliminate the need for marking the price upon each item. Where the price is not marked upon each item, prices can be easily changed by reprogramming the memory with the latest prices.

Even where the customer is supplied with an itemized sales slip, it is believed that the customer still would want the prices marked on the individual items. From a psychological standpoint, where the price is marked on each item, the customer will feel more secure that no errors or cheating will occur during check-out. In the case of foodstuffs which are packaged or canned or bottled, the price marked on the item provides a reference for ascertaining whether the price has risen or dropped since the previous purchase and facilitates price comparisons where goods are bought from different sellers. Moreover, it is customary to dispose of the sales slip shortly after the purchase and the customer therefore would want the price marked on the item as a more permanent reminder of its cost.

The primary object of this invention is to provide a system in which items carrying machine readable item identifying information are marked with their individual prices at the checkout station by apparatus which associates the coded item identifying information with price information stored in a memory device. To accomplish that objective, the check-out station is arranged to have the coded information on each item read by a scanner. The information derived from the scanner identifies the item and is used to provide access to the price of the item stored in a programmable memory device. The price of the item is then printed on the sales slip which is usually a ribbon of paper. If desired, an identification of the item can also be printed on the sales slip along with the price. In the latter case, the identifying information to be printed can be stored in the memory device. At the time the price is "rung-up", the price can be visually displayed to enable the purchaser to see the price as it is entered. Simultaneously therewith or immediately thereafter, the price is either marked directly upon the item by a printing mechanism or an adhesive tag bearing the price is attached to the item by a tag dispensing mechanism. Preferably, the coded information is read at a scanning station and the item is then conveyed a short distance to another station where an adhesive tag bearing the price information is placed on the item. In systems which employ a manually held wand which scans the encoded information, the printing mechanism can be incorporated in the wand or a separate printer may be used.

In the system contemplated by this invention, items on the shelves, in the display racks, and on the stands would not bear human readable prices. Consequently, prices would be displayed on signs adjacent to the goods for the information of the customers. However if a customer wanted assurance that the machine readable code on the item corresponded to the price marked on the sign or wanted the price marked upon the item before it was brought to the check-out station, auxiliary item marking stations can be placed at several locations in the store. At the auxiliary station a scanner reads the code on the item and a printing mechanism is caused to print the price on the item. Preferably at the auxiliary station, the price is printed directly on the item rather than upon an adhesive tag. By marking the price directly on the item, the price cannot be transferred to another item. Where the price is marked upon an ordinary adhesive tag, an opportunity for fraud is presented inasmuch as the tag can be removed from the item, placed upon a more expensive item, and the code marking on the more expensive item can be obliterated or damaged to prevent reading by the code scanner. In recent years, "tamper-proof" adhesive tags have become available which are constructed to cause the top layer of the tag to separate from the underlying layer if an attempt is made to remove the tag adhered. Preferably, the tamper-proof type of tag would be used at the auxiliary station if the price is to be marked upon an adhesive tag. At the check-out station, an item bearing price markings need not be again marked with the price. To prevent the price from again being marked, the attendant at the check-out station can either enter the price information manually by means of a keyboard or can actuate a switch to inhibit the price tag dispenser where the scanner is employed to read the code on the item.

THE DRAWINGS

DETAILED DESCRIPTION

Figure 1:
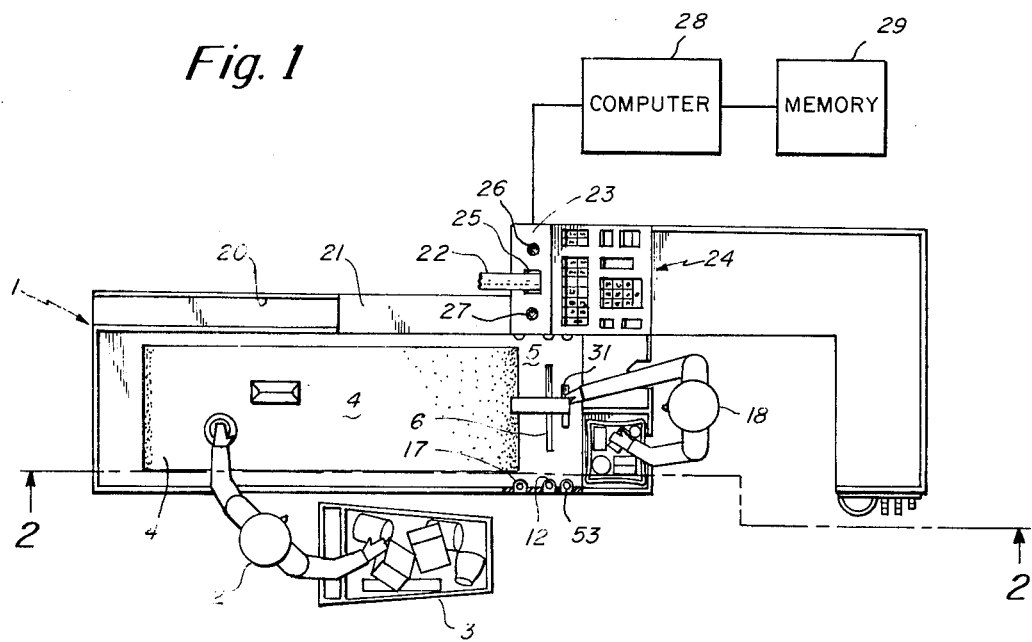
FIG. 1 is a plan view of an automated check-out station employing the invention.
Figure 2:
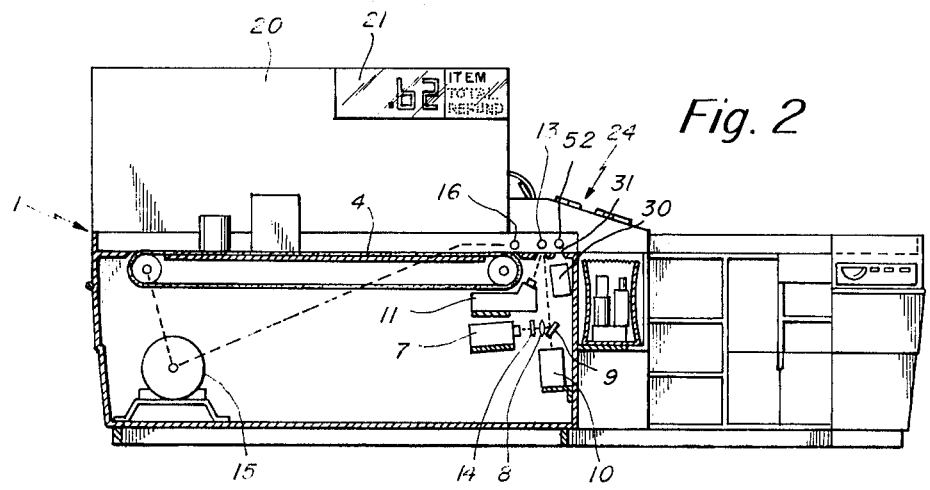
FIG. 2 is an elevational view taken along the plane 2—2 of FIG. 1 and depicts a typical arrangement of apparatus in accordance with the invention.

A check-out station arranged in accordance with the invention is depicted in FIGS. 1 and 2. At the check-out counter 1, the customer 2 takes the items out of the shopping cart 3 and places the items upon a conveyor belt 4 that carries the items to a code reading station 5. Each item carries on it machine readable coded information that identifies the item. For purposes of this exposition, it is assumed that the coded information is in the form of parallel bars of at least two different colors. The so called bar code is now the most common type of code used for identifying processed foods. The encoded information is placed on the item in a position where the information can be read by a scanner located at the reading station. For example, the coded information is marked on the bottom of the item so that it can be read by the scanner as the item passes over a slot 6 in the counter top at the reading station. Disposed beneath the counter top at the reading station is a light source 7 which emits a beam of light that is focussed by a lens 8 into a beam that results in a very small spot imaged upon a mirror 9. The mirror 9 is mounted so that it can be rotated or made to oscillate by a motor 10 whereby the reflected scanning beam repetitively scans along the slot 6 in the counter top in the direction generally transverse to the movement of the item over the slot. When an article bearing encoded information passes over the slot, light from the scanning beaming is reflected from the code markings to a reader 11 which converts the received light to electrical signals.

To sense the presence of an article in the vicinity os slot 6, a light source 12 projects a beam of light toward a photosensor 13. When no article is present in the vicinity of slot 6, light impinging upon the photosensor 13 causes a shutter 14 to be placed across the path of the light beam emanating from source 7 so that the beam cannot reach the mirror 9. An article in the vicinity of slot 6 interrupts the light beamed toward the photosensor 13 and causes a signal from the photosensor to be generated which causes the shutter to be moved out of the path of the beam directed toward the mirror 9.

The conveyor belt 4 is driven by a motor 15 which is controlled by signals from a photosensor 16 positioned near the output end of the belt. When an article on the belt reaches the output end of the belt, a beam of light from a source 17 is prevented from reaching the photosensor 16. Upon the beam being interrupted, the photosensor emits a signal which causes motor 15 to stop so that articles on the conveyor are prevented from piling up at the output end of the belt. An attendant 18 manually moves the article at the belt's output end to the reading station. Thereupon, motor 15 is activated by the light beam impinging upon photosensor 16 and the articles on the belt are again moved toward the output end.

At the check-out counter, a display area 20 located at one side of the conveyor belt 4 holds small items such as candy, razor blades, cigarettes, etc. Adjacent the output end of the conveyor belt, a visual display device 21 is situated where it can readily be viewed by the customer. On the visual display device appears the price of each item as it is entered upon the sales slip 22. The visual display device can also be used to display other information such as the total price, amount of tax added, and the refund due the customer.

A register 23 is positioned where it can be conveniently operated by the attendant 18. The register has a keyboard 24 to enable information to be entered manually, a printing device 25 for printing prices and other information upon a paper tape 22, and may also include communication devices such as a speaker 26 and a microphone 27. The register keyboard and printer are connected to a computer 28 which contains a programmable memory device 29 in which the prices of the merchandize are stored. Keyboard 24 permits entry of information concerning items which do not carry machine readable data, items whose coded markings have been obliterated or damaged, items which are too small to carry encoded information, or bulky items which do not pass through the check-out station but whose delivery is made at a loading dock. Keyboard 24 also may be used for communicating with the computer to obtain sub-totals or totals, to alter the prices of individual items and for various other purposes.

Reader 11 emits item identifying signals to the computer 28. The computer obtains from the memory device 29 the price of the item and conveys the pricing information in the form of electrical signals to the printer 24 of the register, to the visual display device 21 and to a printing mechanism 30 situated beneath the check-out counter adjacent to the reading station 5. The printing mechanism 30 preferably is a device such as the digital printing mechanism model 102, sold by C. Itoh Electronics Inc. of 280 Park Avenue, New York City, New York. That device, in response to electrical signals, prints the price upon an adhesive label which is applied to the item as the item passes over an aperture 31 in the counter top. To dispense the label through the aperture 31 as the item passes over the opening, a label dispenser 32 such as the model 220 labeler sold by Dennison Manufacturing Company of Framingham, Massachusetts can be employed.

Figure 3:
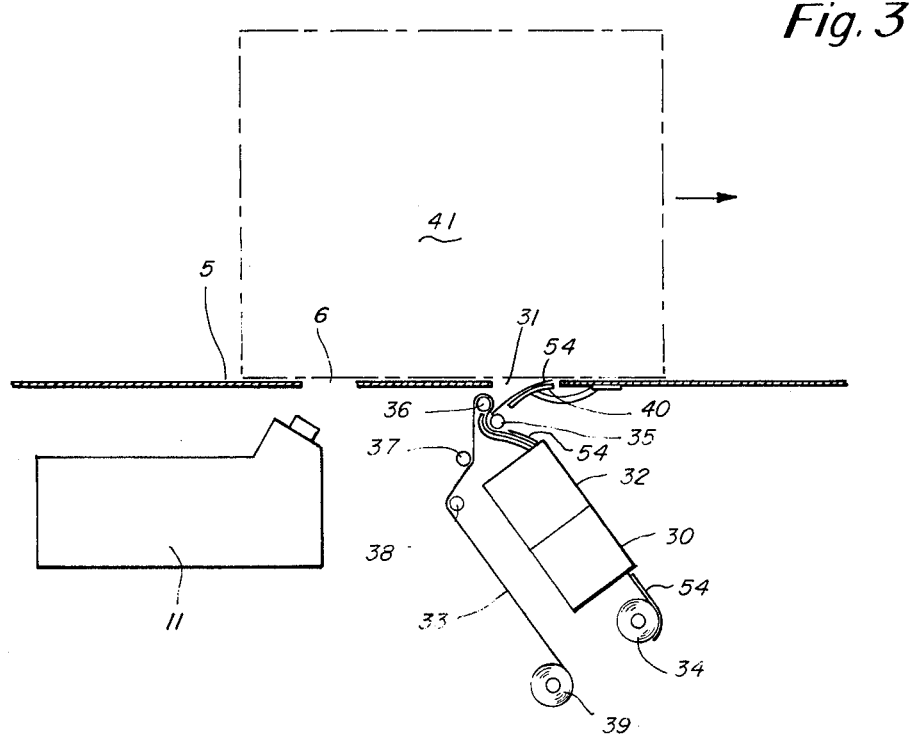
FIG. 3 depicts the scheme of the invention using a printing mechanism and label dispenser disposed beneath the counter at the check-out station.

FIG. 3 schematically depicts the arrangement of the label printer and label dispenser at the check-out station. The adhesive labels are carried on a backing sheet 33 wound upon a spool 34. The backing sheet is arranged to pass through the printer 30 and thence through the label dispenser 32. Adjacent the slot 31, the backing sheet is wound over a roller 35, makes a sharp turn about the idler 36, and then passes over rollers 37 and 38 to a backing sheet take up spool 39. The adhesive employed on the labels is of the pressure sensitive type and the labels are arranged at regular intervals along the backing sheet. At the location where the backing sheet takes a sharp turn around idler 36, the label separates from the backing sheet and as the backing sheet is taken up, the label with its adhesive face uppermost, slides along a curved ramp 40 until it passes through aperture 31 and meets the item 41. Only very slight pressure is required to cause the label to adhere to the item as the item passes over aperture 31. A photoelectric sensor or pressure operated switch can be employed to sense the presence of the item as it passes over aperture 31 to insure that the label is dispensed at the appropriate time.

Figure 4:
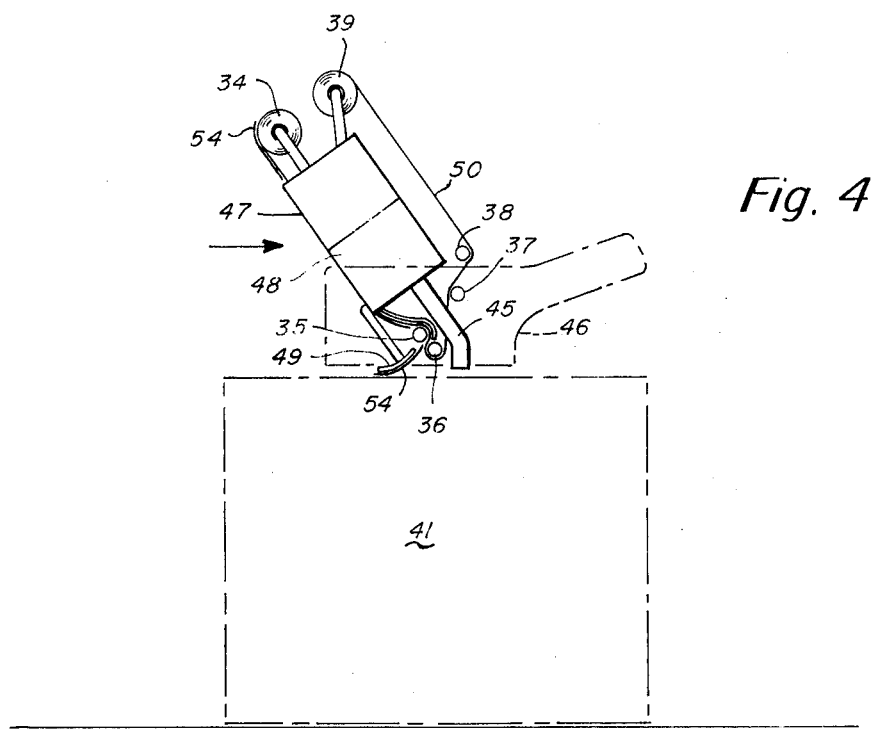
FIG. 4 depicts the scheme of the invention employing a printing mechanism and label dispenser situated in a hand-held code scanner.

FIG. 4 schematically depicts a hand-held scanner carrying the label printer and label dispenser. In installations employing a hand-held scanner to read the machine readable code, the scanner is manually positioned over the bar code on the item to enable the code to be read. Where the hand-held apparatus is weighty, a system of counterweighting can be employed to reduce the burden upon the attendant handling the scanner. The scanner may be of any type that is suitable to read the code on the merchandize and derive signals therefrom which identify the item. The scanner is shown in FIG. 4 as having a scanning head 45 extending from a housing 46 in which are situated a printer 47 and a label dispenser 48.

The scanner, printer, and dispenser are connected by a cable to a computer. Upon reading the code upon an item of merchandize, the scanner emits signals to the computer. The computer correlates those signals with pricing information stored in a memory device and transmits the pricing information to the printer 47 in the form of electrical signals. In response to those signals, the printer prints the price upon an adhesive tag. The tag is dispensed upon a curved plate 49 and adheres to merchandize whose code has been read by the scanner. The tags are carried upon a backing sheet 50 which passes through the dispenser 48 in the same manner as previously described herein so as to cause the tag to separate from the backing sheet and slide along the curved plate with its adhesive side facing the item to which it is to be attached.

By situating the printer and tag dispenser on the wand containing the code scanner, items of merchandize can be randomly disposed upon the check-out counter and the wand can be held over each item to read its code. Consequently, the items do not have to pass through a reading station as they do in the arrangement illustrated in FIGS. 1, 2, and 3. By causing the tag to be printed with the price and promptly dispensed, assurance is obtained that the tag is deposited upon the correct article. Further, the attendant and customer are able to see the price tag because it is on top of the package and is therefore readily visible.

Instead of marking the price upon an adhesive tag, the printer in the wand can be arranged to print the price directly upon the item of merchandize. In such an installation, the printer is resiliently mounted in the housing so that only moderate pressure is exerted upon the item when it is marked with the human readable price.

In accordance with the invention, the items of merchandize on the shelves, in the display racks, and on the stands usually would not bear human readable prices. The prices would be stored in a programmable memory device to enable the prices to be easily changed by changing the price information in the memory device. To inform the customer, prices would be displayed on signs adjacent to the goods. Where a customer desires assurance that the machine readable code on the corresponds to the price marked on the sign or desires to have the price marked upon the goods before it is brought to the check-out station, auxiliary marking stations are placed at a number of locations in the market. The auxiliary station can be arranged as shown in FIG. 3 with a scanner disposed to read the code on the item and provide product identifying signals to the computer. The computer in turn transmits signals to the printer to cause that device to print the price upon a tamper-proof adhesive tag which is then disposed by a label dispenser so that the tag adheres to the item. At the check-out station, an item bearing human readable price markings need not be again marked with the price. To prevent the price from again being marked, the attendant at the check-out station can either enter the price information manually through the keyboard or can actuate a switch to inhibit the printer and price tag dispenser where the scanner is employed to read the code on the item. In more sophisticated installations, the apparatus at the check-out station can be arranged to automatically sense the presence of price markings on the item and thereupon inhibit the printer and tag dispenser.

It should be understood that the arrangements depicted in the drawings are exemplary only and that the invention can take different and varied forms. Accordingly, it is intended that the invention not be limited to the specific forms illustrated or described herein but rather that the scope of the invention be delimited by the appended claims.

I claim:

1. In an automated check-out system of the type wherein individual items of merchandize are marked with a machine readable code identifying the item and wherein the check-out station includes
   1. a scanner for reading the machine readable code and deriving signals therefrom, and
   2. apparatus responsive to the signals from the scanner for correlating the code read by the scanner with the price of the item and for emitting signals designating the price, the improvement wherein
   the apparatus at the check-out station includes a printing mechanism responsive to the signals designating the price, the printing mechanism being arranged to place the price in human readable form on the individual item.

2. In an automated check-out system of the type wherein individual items of merchandize are marked with a machine readable code identifying the item and wherein the check-out station includes
   1. a scanner for reading the machine readable code and deriving signals therefrom, and
   2. apparatus responsive to the signals from the scanner for correlating the code read by the scanner with the price of the item and for emitting signals designating the price, the improvement wherein
   the apparatus at the check-out station includes a mechanism responsive to the signals designating the price, the mechanism being arranged to place the price in human readable form on the individual item, and the mechanism has
   a. a printer responsive to the signals designating the price, the printer printing the price upon an adhesive tag, and
   b. a dispenser arranged to place the adhesive tag upon the individual item.

3. The improvement according to claim 1, further including
   auxiliary stations remote from the check-out station, each auxiliary station having a scanner for reading the machine readable code, and a printing mechanism for placing the price in human readable form on the individual item and wherein
   the apparatus at the check-out station includes means for inhibiting the printing mechanism at the check-out from again marking the price in human readable form on an item already bearing the price in human readable form.

* * * * *